US009687776B2

(12) United States Patent
Lee et al.

(10) Patent No.: US 9,687,776 B2
(45) Date of Patent: Jun. 27, 2017

(54) APPARATUS AND METHOD FOR RECOVERY OF TARGET GAS

(71) Applicant: KOREA INSTITUTE OF SCIENCE AND TECHNOLOGY, Seoul (KR)

(72) Inventors: Sanghyup Lee, Seoul (KR); Soonjae Lee, Seoul (KR); Jae Woo Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 139 days.

(21) Appl. No.: 14/744,181

(22) Filed: Jun. 19, 2015

(65) Prior Publication Data
US 2015/0367278 A1    Dec. 24, 2015

(30) Foreign Application Priority Data

Jun. 20, 2014  (KR) .......................... 10-2014-0075902

(51) Int. Cl.
*B01D 53/22*    (2006.01)

(52) U.S. Cl.
CPC ........ *B01D 53/22* (2013.01); *B01D 2053/221* (2013.01); *B01D 2257/204* (2013.01); *B01D 2257/30* (2013.01)

(58) Field of Classification Search
CPC .... B01D 53/22; B01D 53/221; B01D 53/225; B01D 2257/204; B01D 2257/30; B01D 2053/221
See application file for complete search history.

(56) References Cited

U.S. PATENT DOCUMENTS

| 4,857,082 A | * | 8/1989 | DiMartino, Sr. | ...... B01D 53/22 |
| | | | | 95/19 |
| 5,960,777 A | * | 10/1999 | Nemser | ................ B01D 53/228 |
| | | | | 123/26 |

(Continued)

FOREIGN PATENT DOCUMENTS

KR    10-2012-0033472 A    4/2012
KR    10-2012-0077322 A    7/2012
(Continued)

*Primary Examiner* — Jason M Greene
(74) *Attorney, Agent, or Firm* — NSIP Law (57) ABSTRACT

Disclosed is an apparatus and method for recovery of target gas, which may increase a target gas concentration in a recovered gas by using a single gas separation membrane module and a plurality of gas storage tanks. The apparatus for recovery of target gas includes a gas separation membrane module configured to perform an enrichment process n times (n is a natural number) so that an injected gas is separated into a permeated gas and a recovered gas in each enrichment process, and (n+1) number of gas storage tanks, wherein in an $n^{th}$ enrichment process, gas stored in an $n^{th}$ gas storage tank is supplied to the gas separation membrane module and separated into an $n^{th}$ permeated gas and an $n^{th}$ recovered gas, the $n^{th}$ permeated gas is stored in a $(n-1)^{th}$ gas storage tank, and the $n^{th}$ recovered gas is stored in a $(n+1)^{th}$ gas storage tank.

9 Claims, 4 Drawing Sheets

(56) References Cited

U.S. PATENT DOCUMENTS

| | | | | |
|---|---|---|---|---|
| 6,482,251 B1* | 11/2002 | Kawasaki | ............ | B01D 53/226 95/22 |
| 8,623,120 B2 | 1/2014 | Lee et al. | | |
| 2004/0045432 A1* | 3/2004 | Yamamoto | ............. | B01D 53/22 95/48 |
| 2005/0092177 A1* | 5/2005 | Bonchonsky | ...... | B01D 53/0454 95/138 |
| 2005/0183573 A1* | 8/2005 | Belt | ...................... | B01D 53/229 95/131 |
| 2012/0260799 A1* | 10/2012 | Lee | ...................... | B01D 53/225 95/131 |
| 2016/0059181 A1* | 3/2016 | Kim | ...................... | B01D 53/225 95/51 |

FOREIGN PATENT DOCUMENTS

| | | |
|---|---|---|
| KR | 10-2013-0011393 A | 1/2013 |
| KR | 10-1249261 B1 | 4/2013 |
| KR | 10-1482612 B1 | 1/2015 |
| KR | 10-1505920 B1 | 3/2015 |

\* cited by examiner

APPARATUS AND METHOD FOR RECOVERY OF TARGET GAS

CROSS-REFERENCE TO RELATED APPLICATION

This application claims priority to Korean Patent Application No. 10-2014-0075902, filed on Jun. 20, 2014, and all the benefits accruing therefrom under 35 U.S.C. §119, the contents of which in its entirety are herein incorporated by reference.

BACKGROUND

1. Field

The present disclosure relates to an apparatus and a method for recovery of target gas, and more particularly, to an apparatus and a method for recovery of target gas, which may increase a target gas concentration in a recovered gas based on a single gas separation membrane module and a plurality of gas storage tanks.

[Description about National Research and Development Support]

This study was supported by Ministry of Trade, Industry and Energy of Korea (Project No. 1415131763; Project name: Development of Separation and Enrichment System for low-concentration $SF_6$ Gas for Semiconductor and Display) under the superintendence of the Korea Institute of Energy Technology Evaluation and Planning.

2. Description of the Related Art $SF_6$ is a representative electric insulation material of power equipment and is used in a washing process when manufacturing a semiconductor wafer, an LCD panel or the like. It is known that an influence of $SF_6$ on global warming is about 23,900 times higher than that of carbon dioxide, and in the Climatic Change Convention held at Kyoto in 1997, $SF_6$ was pointed out as one of six materials with greatest global warming potentials. Therefore, it is urgently needed to treat $SF_6$.

In order to treat $SF_6$, first, $SF_6$ may be decomposed. Since $SF_6$ is very stable, high energy like plasma is required to decompose $SF_6$, and during the decomposing process, byproducts such as $S_2F_{10}$, $SF_4$, HF or the like with high toxicity and corrosiveness are generated. Considering the above problems in decomposing and increasing prices of $SF_6$, it is very desirable to effectively recover and reuse $SF_6$ in view of reduction of production costs.

In the $SF_6$ recovering technique, only $SF_6$ is recovered from a mixture gas containing $SF_6$. Such $SF_6$ recovering technique includes cyrogenics, PSA (pressure swing adsorption), membrane separation and so on, among which membrane separation method using a gas separation membrane module is being widely studied. The membrane separation method has advantages since it has relatively simple equipment and relatively excellent recovery rate. An example of the membrane separation method is disclosed in Korean Patent Registration No. 10-1249261.

In the membrane separation method, waste gas is injected into a separation membrane module, and the separation membrane module separates the injected waste gas into $SF_6$ (recovered gas) and other gas (permeated gas). The treatment characteristic of the membrane separation method is determined by selectivity and permeability of the separation membrane module. If the separation membrane module has high permeability, a treatment capacity is great. However if the separation membrane has high permeability, selectivity is low and thus separation performance for the recovered gas is low.

As described above, selectivity and permeability of the separation membrane module have a trade-off relation, and thus in the existing technique, a plurality of separation membrane modules is provided in multi stage manners to ensure separation performance and treatment capacity to some extent. However, if a plurality of separation membrane modules is repeatedly provided in multi stages, the configuration becomes complicated. To solve this problem, the applicant of this application has proposed an apparatus which includes two separation membrane modules (a first separation membrane module and a second separation membrane module) so that recovered gas and permeated gas of the first separation membrane module are respectively circulated to increase a recovery rate, in a Korean Patent Application No. 2013-118138.

SUMMARY

The present disclosure is directed to providing an apparatus and method for recovery of target gas in retentate, which may increase a target gas concentration in a recovered gas by using a single gas separation membrane module and a plurality of gas storage tanks.

In one aspect, there is provided an apparatus for recovery of target gas, which includes: a gas separation membrane module configured to perform an enrichment process n times (n is a natural number) so that an injected gas is separated into a permeated gas and a recovered gas in each enrichment process; and (n+1) number of gas storage tanks, wherein in an $n^{th}$ enrichment process, gas stored in an $n^{th}$ gas storage tank is supplied to the gas separation membrane module and separated into an $n^{th}$ permeated gas and an $n^{th}$ recovered gas, the $n^{th}$ permeated gas is stored in a $(n-1)^{th}$ gas storage tank, and the $n^{th}$ recovered gas is stored in a $(n+1)^{th}$ gas storage tank.

In an example embodiment, the $(n+1)^{th}$ gas storage tank may store the $n^{th}$ recovered gas and a $(n+2)^{th}$ permeated gas.

In an example embodiment, the apparatus may further include a stage-cut (SC) regulator configured to control a SC value of the gas separation membrane module in each enrichment process, and a SC value ($\theta_n$) of the $n^{th}$ enrichment process is set according to a following equation:

$$\theta_n = \frac{e_n - 1}{e_n - \frac{1}{(1-x_n)\alpha + x_n}} \quad \text{Equation}$$

where $\theta_n$ represents the SC value in the $n^{th}$ enrichment process, $e_n$ represents a target enrichment of the $n^{th}$ enrichment process, $x_n$ represents a target gas concentration in the injected gas injected into the gas separation membrane module in the $n^{th}$ enrichment process, and $\alpha$ represents selectivity of the gas separation membrane module.

In an example embodiment, the apparatus may further include a supply pressure control device, and the supply pressure control device may control a pressure of the gas supplied to the gas separation membrane module in each enrichment process to a constant pressure ($P_0$).

In an example embodiment, the apparatus may further include a waste gas supply unit configured to supply waste gas containing a target gas to a first gas storage tank, the first gas storage tank may store the waste gas supplied from the waste gas supply unit and a second permeated gas, and a first permeated gas of the first enrichment process may be discharged out.

In an example embodiment, a target gas concentration ($y_n$) of the $n^{th}$ permeated gas separated in the $n^{th}$ enrichment process may be calculated according to a following equation:

$$y_n = \frac{x_n}{(1-x_n)\alpha + x_n} \qquad \text{Equation}$$

where $y_n$ represents a target gas concentration included in the $n^{th}$ permeated gas of the $n^{th}$ enrichment process, $x_n$ represents a target gas concentration included in the injected gas injected into the gas separation membrane module in the $n^{th}$ enrichment process, and $\alpha$ represents selectivity of the gas separation membrane module.

In an example embodiment, a membrane area of the gas separation membrane module may be set according to a following equation:

$$A = \frac{f_1 \theta_1}{P_0(P_A(1-x_0) + P_B x_0)} \qquad \text{Equation}$$

where A represents a membrane area of the gas separation membrane module, $f_1$ represents an injected gas flux of the first enrichment process, $\theta_1$ represents a first SC value of the first enrichment process, $P_0$ represents a supply pressure of the injected gas injected into the gas separation membrane module, $P_A$ represents permeability of the permeated gas, $P_B$ represents permeability of the target gas, and $x_0$ represents a target gas concentration in the waste gas.

In an example embodiment, an operating time ($T_1$) of the first enrichment process may satisfy Equation 1 below, and an operating time ($T_n$) of the $n^{th}$ enrichment process (n is a natural number of 2 or above) may satisfy Equation 2 below:

$$T_1 \leq \frac{C_1(P_{1,max} - P_0)}{f_{F,1} - f_0} \qquad \text{Equation 1}$$

where $T_1$ represents an operating time of the first enrichment process, $C_1$ represents capacity of the first gas storage tank, $P_{1,max}$ represents a maximum gas pressure in the first gas storage tank, $P_0$ represents a supply pressure of the injected gas supplied to the gas separation membrane module, $f_{F,1}$ represents a flux of the injected gas in the first enrichment process, and $f_0$ represents a flux of the waste gas in the first enrichment process, $$T_n \leq \frac{C_n(P_{n,max} - P_0)}{f_{F,n}} \qquad \text{Equation 2}$$

where $T_n$ (n is a natural number of 2 or above) represents an operating time of the $n^{th}$ enrichment process, $C_n$ represents capacity of the $n^{th}$ gas storage tank, $P_{n,max}$ represents a maximum gas pressure in the $n^{th}$ gas storage tank, $P_0$ represents a supply pressure of the injected gas supplied to the gas separation membrane module, and $f_{F,n}$ represents a flux of the injected gas in the $n^{th}$ enrichment process.

In another aspect of the present disclosure, there is provided a method for recovery of target gas, wherein a single gas separation membrane module and (n+1) number of gas storage tanks (n is a natural number) are used, wherein the gas separation membrane module performs an enrichment processes n times (n is a natural number), so that an injected gas is separated into a permeated gas and a recovered gas in each enrichment process, and wherein in an $n^{th}$ enrichment process, gas stored in an $n^{th}$ gas storage tank is supplied to the gas separation membrane module and separated into an $n^{th}$ permeated gas and an $n^{th}$ recovered gas, the $n^{th}$ permeated gas is stored in a $(n-1)^{th}$ gas storage tank, and the $n^{th}$ recovered gas is stored in a $(n+1)^{th}$ gas storage tank.

In an example embodiment, a first permeated gas of the first enrichment process may be discharged out, and the first gas storage tank may store waste gas supplied from a waste gas supply unit and a second permeated gas.

In an example embodiment, the method may further comprise: a SC regulator configured to control a SC value of the gas separation membrane module in an $n^{th}$ enrichment process, wherein the SC value ($\theta_n$) of the $n^{th}$ enrichment process is set according to a following equation:

$$\theta_n = \frac{e_n - 1}{e_n - \frac{1}{(1-x_n)\alpha + x_n}} \qquad \text{Equation}$$

where $\theta_n$ represents the SC value in the $n^{th}$ enrichment process, $e_n$ represents a target enrichment of the $n^{th}$ enrichment process, $x_n$ represents a target gas concentration in the injected gas injected into the gas separation membrane module in the $n^{th}$ enrichment process, and $\alpha$ represents selectivity of the gas separation membrane module.

In an example embodiment, a pressure of the gas supplied to the gas separation membrane module in each enrichment process is controlled constantly In an example embodiment, a target gas concentration ($y_n$) of the $n^{th}$ permeated gas separated in the $n^{th}$ enrichment process is calculated according to a following equation:

$$y_n = \frac{x_n}{(1-x_n)\alpha + x_n} \qquad \text{Equation}$$

where $y_n$ represents a target gas concentration included in the $n^{th}$ permeated gas of the $n^{th}$ enrichment process, $x_n$ represents a target gas concentration included in the injected gas injected into the gas separation membrane module in the $n^{th}$ enrichment process, and $\alpha$ represents selectivity of the gas separation membrane module.

In an example embodiment, a membrane area of the gas separation membrane module is set according to a following equation:

$$A = \frac{f_1 \theta_1}{P_0(P_A(1-x_0) + P_B x_0)} \qquad \text{Equation}$$

where A represents a membrane area of the gas separation membrane module, $f_1$ represents an injected gas flux of the first enrichment process, $\theta_1$ represents a first SC value of the first enrichment process, $P_0$ represents a supply pressure of the injected gas injected into the gas separation membrane module, $P_A$ represents permeability of the permeated gas, $P_B$ represents permeability of the target gas, and $x_0$ represents a target gas concentration in the waste gas.

In an example embodiment, an operating time ($T_1$) of the first enrichment process satisfies Equation 1 below, and an operating time ($T_n$) of the $n^{th}$ enrichment process (n is a natural number of 2 or above) satisfies Equation 2 below:

$$T_1 \le \frac{C_1(P_{1,max} - P_0)}{f_{F,1} - f_0} \qquad \text{Equation 1}$$

where $T_1$ represents an operating time of the first enrichment process, $C_1$ represents capacity of the first gas storage tank, $P_{1,max}$ represents a maximum gas pressure in the first gas storage tank, $P_0$ represents a supply pressure of the injected gas supplied to the gas separation membrane module, $f_{F,1}$ represents a flux of the injected gas in the first enrichment process, and $f_0$ represents a flux of the waste gas in the first enrichment process, $$T_n \le \frac{C_n(P_{n,max} - P_0)}{f_{F,n}} \qquad \text{Equation 2}$$

where $T_n$ (n is a natural number of 2 or above) represents an operating time of the $n^{th}$ enrichment process, $C_n$ represents capacity of the $n^{th}$ gas storage tank, $P_{n,max}$ represents a maximum gas pressure in the $n^{th}$ gas storage tank, $P_0$ represents a supply pressure of the injected gas supplied to the gas separation membrane module, and $f_{F,n}$ represents a flux of the injected gas in the $n^{th}$ enrichment process.

According to the present disclosure, It is possible to maximize a target gas concentration in a recovered gas by using a single gas separation membrane module, and thus the configuration of the apparatus for recovery of target gas may be simplified.

DETAILED DESCRIPTION

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose exemplary embodiments.

The present disclosure is directed to a technique for maximizing an enrichment of a target gas contained in a recovered gas, when separating an injected gas into a permeated gas and a recovered gas through a gas separation membrane module and retrieving the recovered gas.

Generally, in order to enhance an enrichment of a target gas, it is premised that a plurality of gas separation membrane modules is used. However, the present disclosure proposes a technique for maximizing an enrichment of a target gas by using a single gas separation membrane module.

The gas separation membrane module used in the present disclosure allows a high-permeable gas having a relatively smaller molecular size (hereinafter, referred to as a 'permeated gas') to pass through pores and allows a low-permeable gas having a relatively greater molecular size (hereinafter, referred to as a 'recovered gas') to remain in the gas separation membrane module and be recovered. Here, if an injected gas is supplied to the gas separation membrane module, the injected gas is separated into a permeated gas and a recovered gas by means of the gas separation membrane module. In addition, the target gas means a gas to be finally recovered through the gas separation membrane module, and this is, for example, $SF_6$ contained in a waste gas. The target gas ($SF_6$) is contained in the waste gas in a constant concentration, and if the waste gas is separated into a permeated gas and a recovered gas by the gas separation membrane module, the target gas is mostly contained in the recovered gas, and a small amount of target gas is contained in the permeated gas.

In the present disclosure, in order to enhance an enrichment of the target gas through a single gas separation membrane module, a plurality of gas storage tanks is applied, and a plurality of enrichment processes is performed in order using the single gas separation membrane module and the plurality of gas storage tanks. By performing the plurality of enrichment processes in order, the concentration of the target gas contained in the recovered gas may be gradually increased.

Hereinafter, an apparatus and method for recovery of target gas according to an embodiment of the present disclosure will be described in detail with reference to the accompanying drawings.

Figure 1:
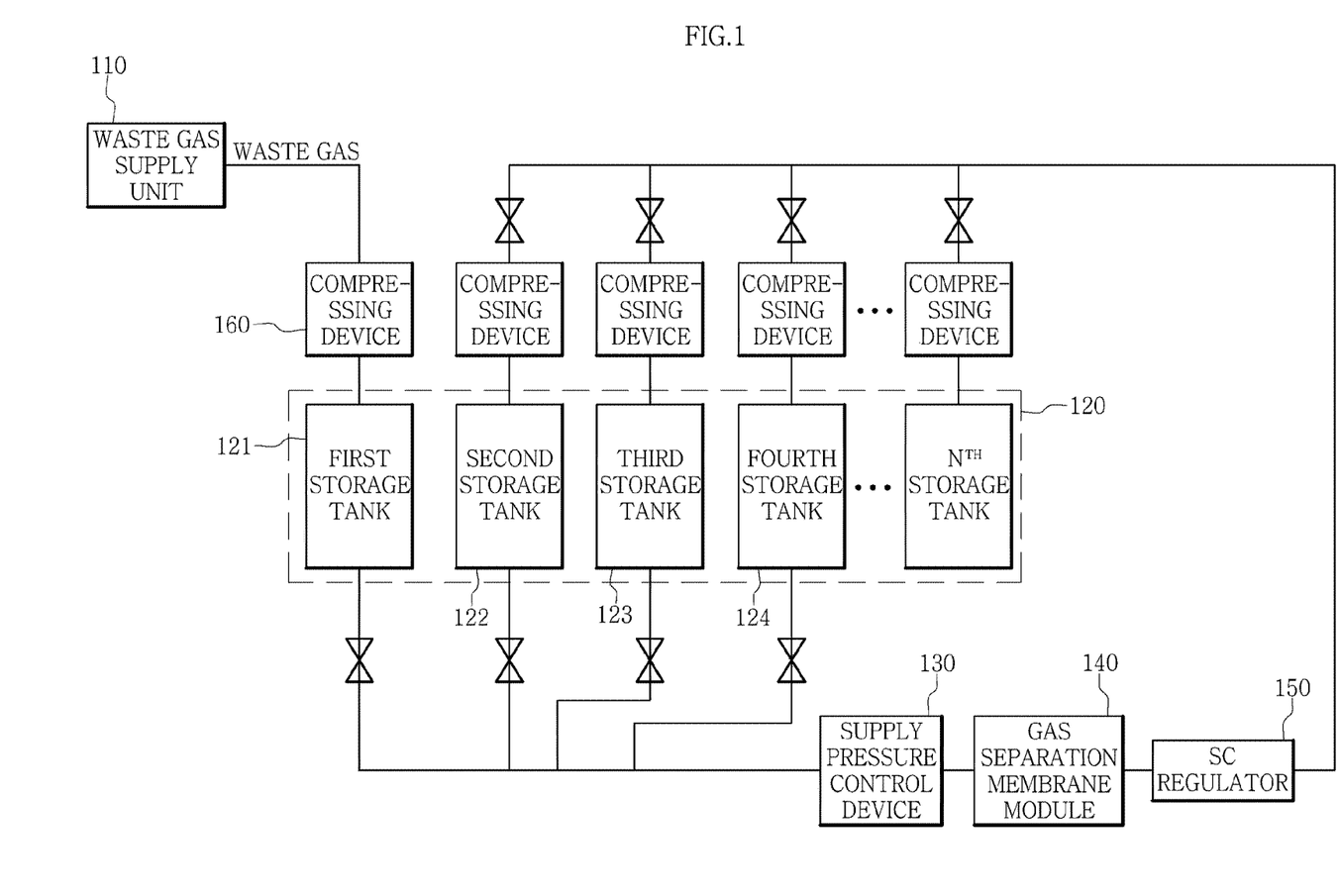
FIG. 1 is a diagram showing an apparatus for recovery of retentate according to an embodiment of the present disclosure.

Referring to FIG. 1, the apparatus for recovery of target gas according to an embodiment of the present disclosure includes a waste gas supply unit 110, a plurality of gas storage tanks 120, a supply pressure control device 130, a gas separation membrane module 140 and a stage-cut (SC) regulator 150.

The waste gas supply unit 110 plays a role of supplying a waste gas containing a target gas to the first gas storage tank 121. The target gas is a gas to be recovered through the gas separation membrane module 140. As for the waste gas containing a target gas, a waste gas containing $SF_6$ or a waste gas containing a fluoride gas such as $NF_3$, $CF_4$ or the like may be employed, and herein, $SF_6$, $NF_3$, $CF_4$ or the like is the target gas. In the waste gas, the target gas is mixed in a certain concentration. The following description will be based on, for example, a waste gas containing $SF_6$.

The plurality of gas storage tanks plays a role of storing a permeated gas and a recovered gas generated in each enrichment process and supplying the stored gas to the gas separation membrane module 140 as an injected gas. The enrichment process means a process for separating the injected gas into a permeated gas and a recovered gas by the gas separation membrane module 140. In the present disclosure, a plurality of enrichment processes is applied, and injected gases injected into the gas separation membrane module 140 are different in each enrichment processes. In addition, the permeated gas and the recovered gas separated in each enrichment process are selectively stored in the plurality of gas storage tanks.

In detail, in a first enrichment process (see FIG. 2a), the gas stored in a first gas storage tank 121 is supplied to the gas separation membrane module 140 as an injected gas.

Figure 2A:
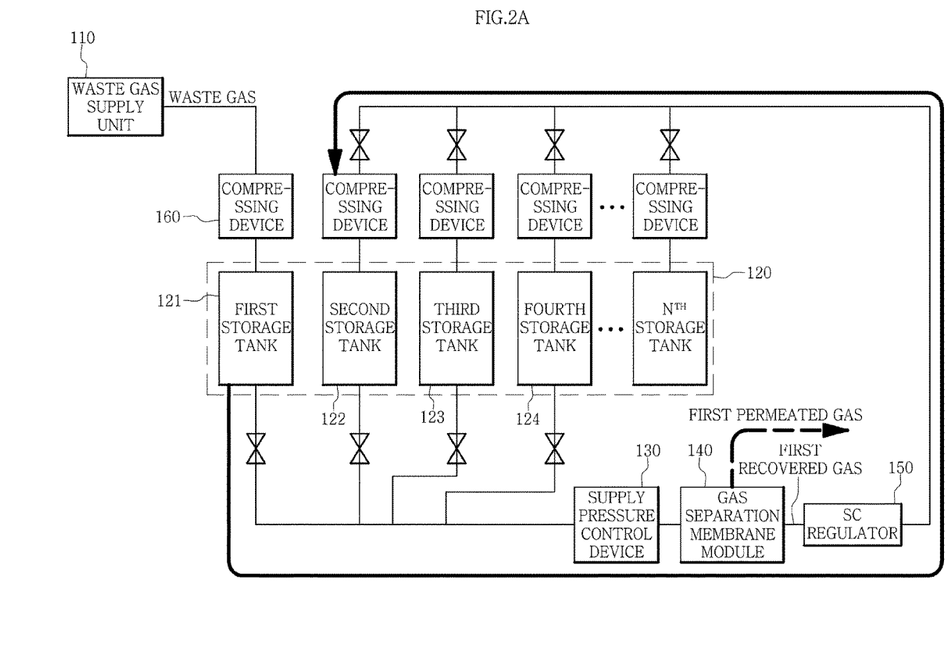
FIGS. 2a to 2c are reference views for illustrating an enrichment process of the apparatus for recovery of target gas according to an embodiment of the present disclosure.

Here, a first permeated gas separated by the gas separation membrane module 140 is discharged out, and a first recovered gas separated by the gas separation membrane module 140 is stored in a second gas storage tank 122. In the first gas storage tank 121, a waste gas supplied from the waste gas supply unit 110 and a second permeated gas separated in a second enrichment process, described later, are stored.

Figure 2B:
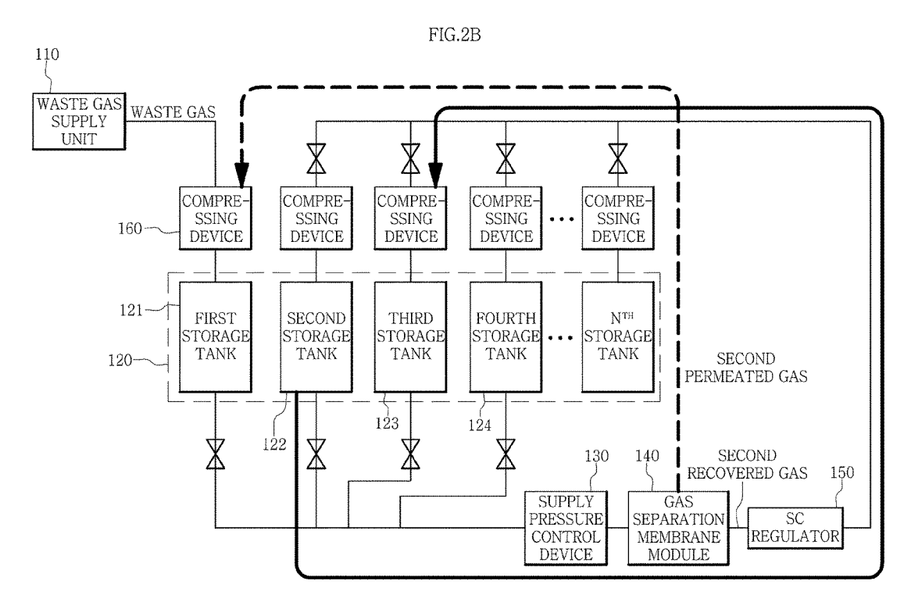
Figure 2C:
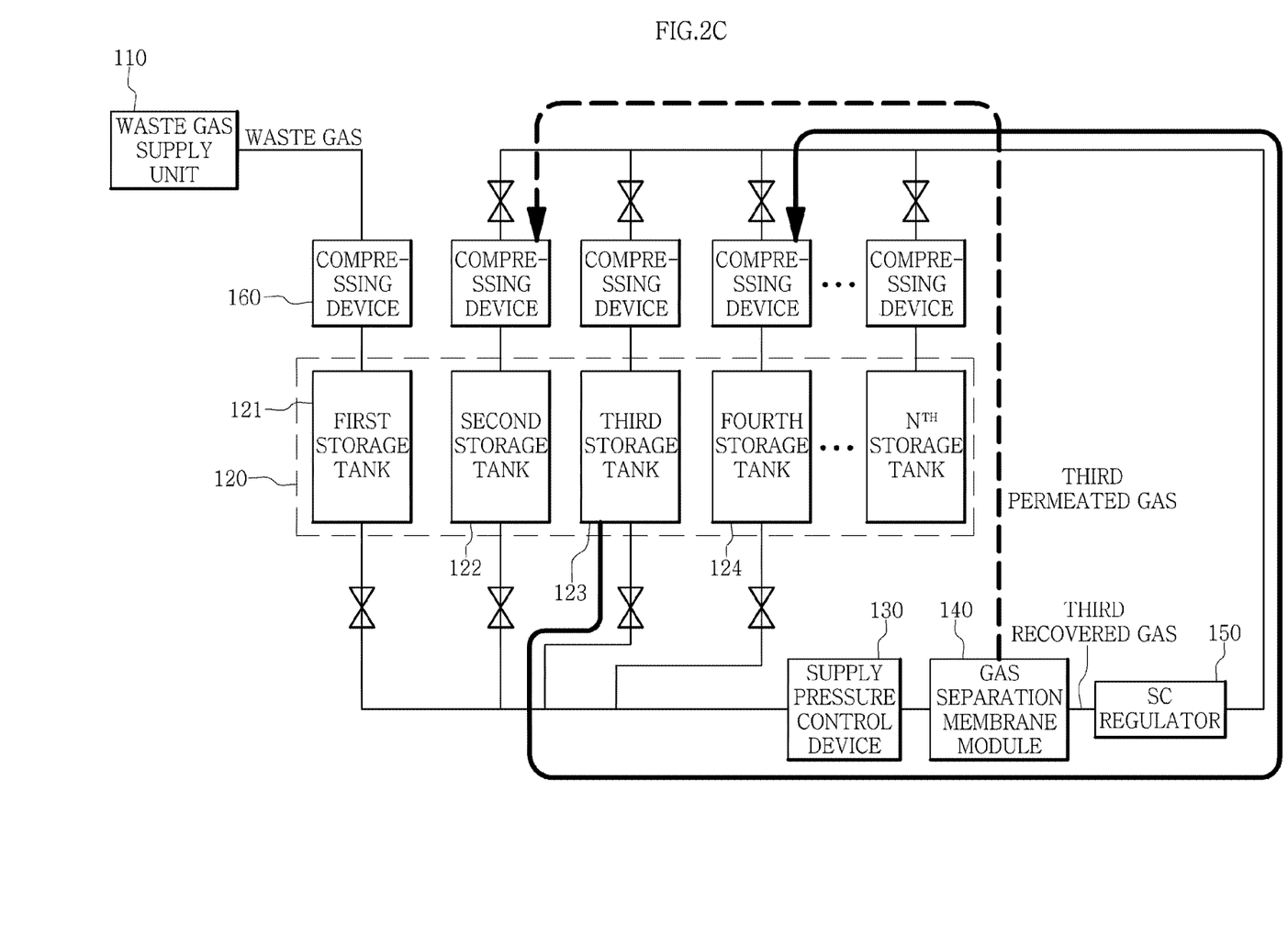

In a second enrichment process (see FIG. 2b), the gas stored in the second gas storage tank 122 is supplied to the gas separation membrane module 140 and separated into a second permeated gas and a second recovered gas. Here, the second permeated gas is stored in the first gas storage tank 121, and the second recovered gas is stored in a third gas storage tank 123. In addition, in a third enrichment process (see FIG. 2c), the gas stored in the third gas storage tank 123 is supplied to the gas separation membrane module 140 and separated into a third permeated gas and a third recovered gas. Here, the third permeated gas is stored in the second gas storage tank 122, and the third recovered gas is stored in a fourth gas storage tank 124.

In each enrichment process, a relation between a gas storage tank for supplying an injected gas to the gas separation membrane module 140 and a gas storage tank for storing a permeated gas and a recovered gas separated by the gas separation membrane module 140 may be defined as follows.

In an $n^{th}$ enrichment process (n is a natural number), the gas stored in an $n^{th}$ gas storage tank is supplied to the gas separation membrane module 140 and separated into an $n^{th}$ permeated gas and an $n^{th}$ recovered gas. Here, the $n^{th}$ permeated gas is stored in a $(n-1)^{th}$ gas storage tank, and the $n^{th}$ recovered gas is stored in a $(n+1)^{th}$ gas storage tank. However, the first permeated gas of the first enrichment process is not stored in a gas storage tank but discharged out.

From the viewpoint of the kind of gas stored in a gas storage tank, the second gas storage tank 122 stores the first recovered gas and the third permeated gas, the third gas storage tank 123 stores the second recovered gas and the fourth permeated gas, and the fourth gas storage tank 124 stores the third recovered gas and the fifth permeated gas. That is, the $(n+1)^{th}$ gas storage tank (n is a natural number) stores an $n^{th}$ recovered gas and a $(n+2)^{th}$ permeated gas. However, the first gas storage tank 121 stores a waste gas supplied from the waste gas supply unit 110 and the second permeated gas.

When the plurality of enrichment processes is performed in order, since the first permeated gas of the first enrichment process is discharged out, the gases stored in the second gas storage tank 122 to the $n^{th}$ gas storage tank through the plurality of enrichment processes may be regarded as gases separated from the first recovered gas. In addition, since a recovered gas separated from the gas stored in a former-stage gas storage tank is stored in a later-stage gas storage tank, as more enrichment processes are performed, a target gas concentration in the recovered gas is gradually increased.

The plurality of enrichment processes, namely the first enrichment process to the $n^{th}$ enrichment process, may be performed in order, and the order may be changed depending on operation situations. For example, the method for recovery of target gas may be performed in order of a first enrichment process, a second enrichment process, . . . , an $n^{th}$ enrichment process, or the order of the plurality of enrichment processes may be changed depending on operation situations, for example, into a first enrichment process→a second enrichment process→a third enrichment process→a first enrichment process→a fourth enrichment process.

Meanwhile, a compressing device 160 such as a compressor may be further provided to compress gas at the front end of each gas storage tank.

Next, when the gas stored in each gas storage tank is supplied to the gas separation membrane module 140, the supply pressure control device 130 plays a role of controlling a pressure of the gas so that the corresponding gas is supplied to the gas separation membrane module 140 in a constant pressure. The pressure of the gas stored in each gas storage tank varies while the enrichment processes are performed since a permeated gas and a recovered gas flow in or out, and thus, in order to supply gas to the gas separation membrane module 140 in a constant pressure, the gas supplied from each gas storage tank to the gas separation membrane module 140 should be controlled to a constant pressure ($P_0$).

The gas separation membrane module 140 plays a role of separating the gas supplied from the gas storage tank into a permeated gas and a recovered gas, and as described above, a first enrichment process, a second enrichment process, . . . , and an $n^{th}$ enrichment process are performed in order by the gas separation membrane module 140.

The gas separation membrane module 140 is an assembly of a separation membrane which may have hollow fibers having pores in its surface. Here, a gas having a relatively smaller molecular size such as $O_2$, $N_2$, $CO_2$ or the like, except for $SF_6$ gas, rapidly passes through the pores of the separation membrane and discharges out, and $SF_6$ having a relatively greater molecular size does not pass through the pores but is recovered at one end of the separation membrane. The gas discharged through the pores of the separation membrane is a permeated gas, and the gas recovered at one end of the separation membrane is a recovered gas. At this time, $SF_6$ gas having a relatively greater molecular size as well as gas having a relatively smaller molecular size ($O_2$, $N_2$, $CO_2$ or the like) may be discharged out through the pores of the separation membrane. However, since permeability of the $SF_6$ gas is relatively lower than permeability $O_2$, $N_2$, $CO_2$ or the like, the $SF_6$ gas may be retrieved as a recovered gas. Substantially, gas such as $O_2$, $N_2$, $CO_2$ or the like may be called a high-permeable gas, and the $SF_6$ gas may be called a low-permeable gas.

The SC regulator 150 plays a role of controlling a stage-cut (SC) value of the gas separation membrane module 140 at each enrichment process. The SC value means a ratio of a permeated gas flux in comparison to an injected gas flux, as shown in Equation 2 below. For example, if the SC value is 0.95, the ratio of a permeated gas flux in comparison to an injected gas flux is 95%, the recovered gas flux is 5%, and this means that 5% of the entire injected gas is recovered (see Equation 1 and Equation 2).

injected gas flux($F_f$)=permeated gas flux($F_p$)+recovered gas flux($F_r$)  Equation 1

SC=permeated gas flux($F_p$)/injected gas flux($F_f$)  Equation 2

Meanwhile, the SC value applied to each enrichment process is set (or programmed) in a manner that SC values become smaller as more enrichment processes are performed. That is, in state where the first permeated gas separated in the first enrichment process is discharged out, a following enrichment process is performed based on the first recovered gas, and a recovered gas separated from the gas stored in a former-stage gas storage tank is stored in a later-stage gas storage tank, as discussed above. For this reason, as more enrichment processes are performed, the flux of the recovered gas becomes relatively greater, and the flux of the permeated gas becomes relatively smaller.

The SC value applied to each enrichment process is determined depending on a target enrichment (e), selectivity (α) of the gas separation membrane module 140, and a target gas concentration ($x_f$) in the injected gas. The target enrichment (e) represents a ratio of a target gas concentration ($x_r$) in a recovered gas in comparison to a target gas concentration ($x_f$) in an injected gas (see Equation 3). Also, if the target gas concentration ($x_r$) in the recovered gas is set when the target gas concentration ($x_f$) in the injected gas is given, the target enrichment (e) may be calculated. The selectivity (α) of the gas separation membrane module 140 represents a ratio of permeability $P_A$ of the permeated gas in comparison to permeability $P_B$ of the target gas (see Equation 4).

An $n^{th}$ SC value ($\theta_n$) applied to an $n^{th}$ enrichment process is defined according to Equation 5 below, and the SC value applied to each enrichment process is set to be smaller as more enrichment processes are performed.

$$\text{target enrichment}(e) = x_r/x_f \quad \text{Equation 3}$$

where e represents a target enrichment, $x_f$ represents a target gas concentration in an injected gas, and $x_r$ represents a target gas concentration in a recovered gas.

$$\alpha = P_A/P_B \quad \text{Equation 4}$$

where α represents selectivity of the gas separation membrane module 140, $P_B$ represents permeability of a target gas, and $P_A$ represents permeability of a permeated gas.

$$\theta_n = \frac{e_n - 1}{e_n - \frac{1}{(1-x_n)\alpha + x_n}} \quad \text{Equation 5}$$

where $\theta_n$ represents the SC value in the $n^{th}$ enrichment process, $e_n$ represents a target enrichment of the $n^{th}$ enrichment process, $x_n$ represents a target gas concentration in the injected gas injected into the gas separation membrane module 140 in the $n^{th}$ enrichment process, and α represents selectivity of the gas separation membrane module 140.

Meanwhile, even though it has been described above that the first permeated gas is not stored in a gas storage tank but discharged out, this is on the premise that the target gas concentration in the first permeated gas, namely for example a $SF_6$ concentration in the first permeated gas, is low enough to satisfy a discharging criterion. If the target gas concentration in the first permeated gas does not satisfy a discharging criterion, the first permeated gas may be stored in the first gas storage tank 121 to undergo the first enrichment process once again. In addition, the second permeated gas, the third permeated gas or the like is stored in the gas storage tank and undergo an enrichment process. However, if a target gas concentration included in the corresponding permeated gas does satisfies a discharging criterion, the second permeated gas, the third permeated gas or the like may also be not stored in the gas storage tank but discharged out.

In order to determine whether the target gas concentration in the permeated gas satisfies the discharging criterion, the target gas concentration in the corresponding permeated gas should be accurately calculated. A target gas concentration of a permeated gas generated in each enrichment process may be calculated according to Equation 6 below.

$$y_n = \frac{x_n}{(1-x_n)\alpha + x_n} \quad \text{Equation 6}$$

where $y_n$ represents a target gas concentration included in the $n^{th}$ permeated gas of the $n^{th}$ enrichment process, $x_n$ represents a target gas concentration included in the injected gas injected into the gas separation membrane module 140 in the $n^{th}$ enrichment process, and a represents selectivity of the gas separation membrane module 140.

In addition, an optimal membrane area of the gas separation membrane for performing a plurality of enrichment processes of the present disclosure may also be designed. The optimal membrane area of the gas separation membrane is designed according to Equation 7 below.

$$A = \frac{f_1 \theta_1}{P_0(P_A(1-x_0) + P_B x_0)} \quad \text{Equation 7}$$

where A represents a membrane area of the gas separation membrane module 140, $f_1$ represents an injected gas flux of the first enrichment process, $\theta_1$ represents a first SC value of the first enrichment process, $P_0$ represents a supply pressure of the injected gas injected into the gas separation membrane module 140, $P_A$ represents permeability of the permeated gas, $P_B$ represents permeability of the target gas, and $x_0$ represents a target gas concentration in the waste gas.

Meanwhile, when performing the plurality of enrichment processes, an optimal operating time of each enrichment process may be set.

First, an optimal operating time of the first enrichment process may be defined as follows.

During an operating time ($T_1$) of the first enrichment process, a volume ($V_{in}$) of a waste gas introduced to the first gas storage tank and a volume ($V_{out}$) of an injected gas supplied from the first gas storage tank to the gas separation membrane module are defined according to Equations 8 and 9 below. Based on Equations 8 and 9, a volume decrement ($V_{out} - V_{in}$) in the first gas storage tank at a completion point of the first enrichment process is defined as in Equation 10 below.

Meanwhile, when the first enrichment process is being performed, the pressure in the first gas storage tank is highest ($P_{1,max}$) at a start point of the first enrichment process, and at this time, the volume in the first gas storage tank is defined as $C_1 \cdot P_{1,max}$ ($C_1$ represents capacity of the first gas storage tank). While the first enrichment process is being performed, the gas volume in the first gas storage tank slowly decreases, and accordingly the gas pressure in the first gas storage tank also decreases. Here, if the gas pressure in the first gas storage tank becomes smaller than the supply pressure ($P_0$) to the gas separation membrane module, gas is not supplied to the gas separation membrane module, and thus when the first enrichment process is performed, a minimum volume in the first gas storage tank should be greater than $C_1 \cdot P_0$. For this reason, when the first enrichment process is performed, a gas maximum decrement ($V_{o-i,max}$) in the first gas storage tank may be defined according to Equation 11 below.

From the above, the volume decrement ($V_{out} - V_{in}$) in the first gas storage tank at a completion point of the first enrichment process should be equal to or smaller than the gas maximum decrement ($V_{o-i,max}$) in the first gas storage tank when the first enrichment process is performed (see Equation 12), and an optimal operating time of the first enrichment process satisfying this condition may be set according to Equation 13.

$$V_{in} = T_1 f_0 \quad \text{Equation 8}$$

where $V_{in}$ represents a volume of a waste gas introduced to the first gas storage tank during an operating time of the first enrichment process, $T_1$ represents an operating time of the first enrichment process, and $f_0$ represents a flux of the waste gas of the first enrichment process.

$$V_{out} = T_1 f_{F,1} \qquad \text{Equation 9}$$

where $V_{out}$ represents a volume of an injected gas supplied from the first gas storage tank to the gas separation membrane module during an operating time of the first enrichment process, $T_1$ represents an operating time of the first enrichment process, and $f_{F,1}$ represents a flux of the injected gas in the first enrichment process.

$$V_{out} - V_{in} = T_1 f_{F,1} - T_1 f_0 \qquad \text{Equation 10}$$

$$V_{o\text{-}i,max} = C_1 P_{1,max} - C_1 P_0 \qquad \text{Equation 11}$$

where $V_{o\text{-}i,max}$ represents a gas maximum decrement in the first gas storage tank during the first enrichment process, $C_1$ represents capacity of the first gas storage tank, $P_{1,max}$ represents a maximum gas pressure in the first gas storage tank, and $P_0$ represents a supply pressure of the injected gas supplied to the gas separation membrane module.

$$T_1 f_{F,1} - T_1 f_0 \leq C_1 P_{1,max} - C_1 P_0 \qquad \text{Equation 12}$$
$$T_1 (f_{F,1} - f_0) \leq C_1 (P_{1,max} - P_0)$$

$$T_1 \leq \frac{C_1 (P_{1,max} - P_0)}{f_{F,1} - f_0} \qquad \text{Equation 13}$$

where $T_1$ represents an operating time of the first enrichment process, $C_1$ represents capacity of the first gas storage tank, $P_{1,max}$ represents a maximum gas pressure in the first gas storage tank, $P_0$ represents a supply pressure of the injected gas supplied to the gas separation membrane module, $f_{F,1}$ represents a flux of the injected gas in the first enrichment process, and $f_0$ represents a flux of the waste gas in the first enrichment process.

Heretofore, the optimal operating time of the first enrichment process has been described. The optimal operating time may also be set to an $n^{th}$ enrichment process, in addition to the first enrichment process. The optimal operating time (n is a natural number of 2 or above) of the $n^{th}$ enrichment process is set according to Equation 14 below. In the $n^{th}$ enrichment process (n is a natural number of 2 or above), since a waste gas is not supplied to the $n^{th}$ gas storage tank (n is a natural number of 2 or above), the flux ($f_0$) of the waste gas is excluded from parameters.

$$T_n \leq \frac{C_n (P_{n,max} - P_0)}{f_{F,n}} \qquad \text{Equation 14}$$

where $T_n$ (n is a natural number of 2 or above) represents an operating time of the $n^{th}$ enrichment process, $C_n$ represents capacity of the $n^{th}$ gas storage tank, $P_{n,max}$ represents a maximum gas pressure in the $n^{th}$ gas storage tank, $P_0$ represents a supply pressure of the injected gas supplied to the gas separation membrane module, and $f_{F,n}$ represents a flux of the injected gas in the $n^{th}$ enrichment process.

The flux ($f_{F,1}$) of the injected gas in the first enrichment process and the flux ($f_{F,n}$) of the injected gas in the $n^{th}$ enrichment process, applied to Equations 13 and 14, may be arranged according to Equations 15 and 16 below, respectively.

$$f_{F,1} = \frac{1}{\theta_1} A P_0 (P_A (1 - x_0) + P_B x_0) \qquad \text{Equation 15}$$

where $f_{F,1}$ represents a flux of the injected gas in the first enrichment process, $\theta_1$ represents a first SC value of the first enrichment process, A represents a membrane area of the gas separation membrane module, $P_0$ represents a supply pressure of the injected gas injected into the gas separation membrane module, $P_A$ represents permeability of the permeated gas, $P_B$ represents permeability of the target gas, and $x_0$ represents a target gas concentration in the waste gas.

$$f_{F,n} = \frac{1}{\theta_n} A P_0 (P_A (1 - x_n) + P_B x_n) \qquad \text{Equation 16}$$

where $f_{F,n}$ (n is a natural number) represents a flux of the injected gas in the $n^{th}$ enrichment process, $\theta_n$ represents a SC value of the $n^{th}$ enrichment process, A represents a membrane area of the gas separation membrane module, $P_0$ represents a supply pressure of the injected gas injected into the gas separation membrane module, $P_A$ represents permeability of the permeated gas, $P_B$ represents permeability of the target gas, and $x_n$ represents a target gas concentration in the injected gas injected into the gas separation membrane module in the $n^{th}$ enrichment process.

In addition, the flux ($f_{F,1}$) of the injected gas in the first enrichment process may be arranged according to Equation 17 below in view of the relation between the waste gas flux ($f_0$) and the operating time ($T_i$) of the enrichment process. Equation 17 below is derived on the premise that an entire volume ($f_0 \cdot \Sigma T_i$) of gas treated through the plurality of enrichment processes, performed by the apparatus for recovery of target gas according to the present disclosure, corresponds to a volume ($f_{F,1} \cdot T_1$) of the injected gas injected into the gas separation membrane module during an operating time of the first enrichment process.

$$f_{F,1} \geq f_0 \frac{\Sigma T_i}{T_1} \qquad \text{Equation 17}$$

where $f_{F,1}$ represents a flux of the injected gas in the first enrichment process, $f_0$ represents a flux of the waste gas, $\Sigma T_i$ represents the sum of operating times of the plurality of enrichment processes, and $T_1$ represents an operating time of the first enrichment process.

REFERENCE SYMBOLS

110: waste gas supply unit
120: plurality of gas storage tanks
121: first gas storage tank
122: second gas storage tank
123: third gas storage tank
124: fourth gas storage tank
130: supply pressure control device
140: gas separation membrane module
150: SC regulator
160: compressing device

What is claimed is:
1. An apparatus for recovery of target gas, comprising:
   a gas separation membrane module configured to perform an enrichment process n times (where n is a natural number) such that an injected gas is separated into a permeated gas and a recovered gas in each enrichment process; and (n+1) number of gas storage tanks, wherein in an $n^{th}$ enrichment process, gas stored in an $n^{th}$ gas storage tank is supplied to the gas separation membrane module and separated into an $n^{th}$ permeated gas and an $n^{th}$ recovered gas, the $n^{th}$ permeated gas is stored in a $(n-1)^{th}$ gas storage tank, and the $n^{th}$ recovered gas is stored in a $(n+1)^{th}$ gas storage tank, and wherein a first permeated gas of the first enrichment process is discharged out.

2. The apparatus for recovery of target gas according to claim 1, wherein the $(n+1)^{th}$ gas storage tank stores the $n^{th}$ recovered gas and a $(n+2)^{th}$ permeated gas.

3. The apparatus for recovery of target gas according to claim 1, further comprising:

a stage-cut (SC) regulator configured to control a SC value of the gas separation membrane module in each enrichment process.

4. The apparatus for recovery of target gas according to claim 3, wherein a SC value ($\theta_n$) of the $n^{th}$ enrichment process is set according to a following equation:

$$\theta_n = \frac{e_n - 1}{e_n - \frac{1}{(1-x_n)\alpha + x_n}} \qquad \text{Equation}$$

where $\theta_n$ represents the SC value in the $n^{th}$ enrichment process, $e_n$ represents a target enrichment of the $n^{th}$ enrichment process, $x_n$ represents a target gas concentration in the injected gas injected into the gas separation membrane module in the $n^{th}$ enrichment process, and $\alpha$ represents selectivity of the gas separation membrane module.

5. The apparatus for recovery of target gas according to claim 1, further comprising a supply pressure control device, wherein the supply pressure control device controls a pressure of the gas supplied to the gas separation membrane module in each enrichment process to a constant pressure ($P_0$).

6. The apparatus for recovery of target gas according to claim 1, further comprising:

a waste gas supply unit configured to supply waste gas containing a target gas to a first gas storage tank, wherein the first gas storage tank stores the waste gas supplied from the waste gas supply unit and a second permeated gas.

7. The apparatus for recovery of target gas according to claim 1, wherein a target gas concentration ($y_n$) of the $n^{th}$ permeated gas separated in the $n^{th}$ enrichment process is calculated according to a following equation:

$$y_n = \frac{x_n}{(1-x_n)\alpha + x_n} \qquad \text{Equation}$$

where $y_n$ represents a target gas concentration included in the $n^{th}$ permeated gas of the $n^{th}$ enrichment process, $x_n$ represents a target gas concentration included in the injected gas injected into the gas separation membrane module in the $n^{th}$ enrichment process, and $\alpha$ represents selectivity of the gas separation membrane module.

8. The apparatus for recovery of target gas according to claim 1, wherein a membrane area of the gas separation membrane module is set according to a following equation:

$$A = \frac{f_1 \theta_1}{P_0(P_A(1-x_0) + P_B x_0)} \qquad \text{Equation}$$

where A represents a membrane area of the gas separation membrane module, $f_1$ represents an injected gas flux of the first enrichment process, $\theta_1$ represents a first SC value of the first enrichment process, $P_0$ represents a supply pressure of the injected gas injected into the gas separation membrane module, $P_A$ represents permeability of the permeated gas, $P_B$ represents permeability of the target gas, and $x_0$ represents a target gas concentration in the waste gas.

9. The apparatus for recovery of target gas according to claim 1, wherein an operating time ($T_1$) of the first enrichment process satisfies Equation 1 below, and an operating time ($T_n$) of the $n^{th}$ enrichment process (n is a natural number of 2 or above) satisfies Equation 2 below:

$$T_1 \leq \frac{C_1(P_{1,max} - P_0)}{f_{F,1} - f_0} \qquad \text{Equation 1}$$

where $T_1$ represents an operating time of the first enrichment process, $C_1$ represents capacity of the first gas storage tank, $P_{1,max}$ represents a maximum gas pressure in the first gas storage tank, $P_0$ represents a supply pressure of the injected gas supplied to the gas separation membrane module, $f_{F,1}$ represents a flux of the injected gas in the first enrichment process, and $f_0$ represents a flux of the waste gas in the first enrichment process, $$T_n \leq \frac{C_n(P_{n,max} - P_0)}{f_{F,n}} \qquad \text{Equation 2}$$

where $T_n$ (n is a natural number of 2 or above) represents an operating time of the $n^{th}$ enrichment process, $C_n$ represents capacity of the $n^{th}$ gas storage tank, $P_{n,max}$ represents a maximum gas pressure in the $n^{th}$ gas storage tank, $P_0$ represents a supply pressure of the injected gas supplied to the gas separation membrane module, and $f_{F,n}$ represents a flux of the injected gas in the $n^{th}$ enrichment process.

* * * * *